United States Patent
Gryshchuk

(10) Patent No.: US 11,859,102 B2
(45) Date of Patent: Jan. 2, 2024

(54) SOLVENT-FREE PREPAINT FOR CORROSION PROTECTION AT WELDS AND OTHER REPAIR POINTS ON CATHODICALLY PROTECTED AND CATHODICALLY UNPROTECTED, PLASTIC-SHEATHED STEEL PIPES

(71) Applicant: ISG Isolierchemie GmbH & Co. Kunststoff KG, Herten (DE)

(72) Inventor: Oleg Gryshchuk, Leverkusen (DE)

(73) Assignee: ISG Isolierchemie Gmbh & Co. Kunststoff KG, Herten (DE)

( * ) Notice: Subject to any disclaimer, the term of this patent is extended or adjusted under 35 U.S.C. 154(b) by 274 days.

(21) Appl. No.: 17/192,615

(22) Filed: Mar. 4, 2021

(65) Prior Publication Data

US 2021/0189148 A1 Jun. 24, 2021

Related U.S. Application Data

(63) Continuation of application No. PCT/DE2019/100795, filed on Sep. 4, 2019.

(30) Foreign Application Priority Data

Sep. 4, 2018 (DE) ............... 10 2018 121 477.4

(51) Int. Cl.
| | |
|---|---|
| C09D 5/02 | (2006.01) |
| C09D 7/63 | (2018.01) |
| C09D 5/00 | (2006.01) |
| C09D 5/08 | (2006.01) |
| C09D 109/00 | (2006.01) |
| C09D 111/00 | (2006.01) |
| C09D 123/22 | (2006.01) |
| C09D 127/10 | (2006.01) |
| C09D 193/00 | (2006.01) |

(52) U.S. Cl.
CPC ............ *C09D 5/022* (2013.01); *C09D 5/002* (2013.01); *C09D 5/08* (2013.01); *C09D 7/63* (2018.01); *C09D 109/00* (2013.01); *C09D 111/00* (2013.01); *C09D 123/22* (2013.01); *C09D 127/10* (2013.01); *C09D 193/00* (2013.01)

(58) Field of Classification Search
CPC .......... C09D 5/022; C09D 5/002; C09D 5/08; C09D 7/63; C09D 111/00; C09D 123/22; C09D 127/10; C09D 109/00; C09D 193/00

USPC .......................................................... 524/77
See application file for complete search history.

(56) References Cited

U.S. PATENT DOCUMENTS

| | | | | |
|---|---|---|---|---|
| 3,676,287 A | * | 7/1972 | Flautt et al. ............... | C08J 5/08 |
| | | | | 57/232 |
| 5,091,447 A | * | 2/1992 | Lomasney ................ | B09B 3/00 |
| | | | | 525/122 |
| 10,876,008 B2 | | 12/2020 | Kaiser et al. | |
| 2017/0369739 A1 | | 12/2017 | Hergenrother et al. | |
| 2018/0086923 A1 | * | 3/2018 | Kaiser ..................... | B32B 25/08 |

FOREIGN PATENT DOCUMENTS

| | | | | |
|---|---|---|---|---|
| CN | 106833225 A | * | 6/2017 | ........... C09D 133/04 |
| DE | 102015105747 A1 | | 10/2016 | |
| JP | 2005226064 A | | 8/2005 | |
| JP | 2018119242 A | | 8/2018 | |
| WO | WO9013488 A1 | | 11/1990 | |
| WO | WO0210302 A1 | | 2/2002 | |

OTHER PUBLICATIONS

Translation of CN 106833225, Jun. 13, 2017. (Year: 2017).*
CG-602, Jiangxi Chenguang New Materials Co., downloaded on Jan. 12, 2023. (Year: 2023).*
International Search Report dated Dec. 11, 2019 in corresponding application PCT/DE2019/100795.

* cited by examiner

*Primary Examiner* — Hui H Chin
(74) *Attorney, Agent, or Firm* — Muncy, Geissler, Olds & Lowe, P.C.

(57) ABSTRACT

A solvent-free undercoat composition for corrosion control at welds and other repair sites on plastic-sheathed steel pipes with and without cathodic protection, including a component K1: a water-based rubber dispersion for formation of a barrier layer for isolating the metallic repair site from oxygen, water vapor and water penetrating from externally; a component K2: a water-based resin dispersion for adhesion on the metallic surface of the repair site and on the nonpolar surfaces of the plastic sheathing; a component K3: an aqueous emulsion of prehydrolyzed organofunctional silanes for accelerating the drying, for improving the adhesion to the metallic surface, particularly at elevated temperatures, and for increasing the resistance to cathodic disbondment.

14 Claims, 2 Drawing Sheets

SOLVENT-FREE PREPAINT FOR CORROSION PROTECTION AT WELDS AND OTHER REPAIR POINTS ON CATHODICALLY PROTECTED AND CATHODICALLY UNPROTECTED, PLASTIC-SHEATHED STEEL PIPES

This nonprovisional application is a continuation of International Application No. PCT/DE2019/100795, which was filed on Sep. 4, 2019 and which claims priority to German Patent Application No. 10 2018 121 477.4, which was filed in Germany on Sep. 4, 2018 and which are both herein incorporated by reference.

BACKGROUND OF THE INVENTION

Field of the Invention

The present invention relates to a solvent-free undercoat composition for corrosion control on plastic-sheathed steel pipes with and without cathodic protection.

Description of the Background Art

Anticorrosion wrappings or anticorrosion tape wrappings are typically used in order to provide metallic pipes in pipelines and also in other industrial systems with protection from corrosion. This is the case in particular for the region where media-carrying metallic pipes abut one another, being welded to one another in the relevant abutment region. Welding typically involves, in fact, the initial removal of a factory-applied plastic insulation on the metallic pipes and the subsequent welding of the two pipes to one another. In order for the exposed abutment region of these metallic pipes to be then durably resealed and provided with protection from corrosion, it is necessary to apply an anticorrosion tape wrapping to the surface requiring protection. The repair site must be prepared in such a way as to present an effective adhesion base. The specific task for an undercoat composition suitable for this particular end use is the need to produce reliable adhesion to the three materials present simultaneously at the same repair site, namely: to the exposed outer side of the metallic piping, including weld, to the marginal regions of the polyolefinic plastic sheathing on the piping, which are immediately adjacent to the repair site, and also to the anticorrosion material which replaces plastic sheathing removed in the region of the repair site.

Further requirements include whether the pH of the undercoat composition must be set at neutral to alkaline, in order not to attack the steel surface, which is completely bare at application, whether the viscosity set must allow rapid and economical working, but must also allow self-adhesion beginning immediately on application at the repair site, and/or whether application is possible with extremely simple equipment such as brushes and rollers.

Correspondingly, the undercoat composition, together with the anticorrosion material to be applied to it, such as, for example, an anticorrosion tape applied to the piping treated with the undercoat composition, is required to meet the requirements of the following standards: DIN 30672/ External organic coatings for the corrosion protection of buried and immersed pipelines for continuous operating temperatures up to 50° C. without cathodic corrosion protection—Tapes and shrinkable materials; DIN EN 12068/ Cathodic protection. External organic coatings for the corrosion protection of buried or immersed steel pipelines used in conjunction with cathodic protection—Tapes and shrinkable materials; and DIN EN ISO 21809-3/Petroleum and natural gas industries—External coatings for buried or submerged pipelines used in transportation systems—Part 3: Field joint coatings.

If at any point on one of the three stated materials at least present there is a failure of adhesion, even if only partially, the entire corrosion control system is ineffective. Only the reliable adhesion of the corrosion control system both to the repair site on the steel piping and to the adjacent marginal regions of the plastic sheathing results in a durably corrosion-resistant seam site or repair site on steel piping, especially in a pipeline. The connecting element for this is the undercoat composition.

Lastly, the dried undercoat composition must also have inherent imperviousness to water and to oxygen, in order to ensure the corrosion of the metallic surface before and also after the application of the corrosion control system.

Another important factor is the capacity of the undercoat composition to bring about the reliable adhesion both on cathodically protected steel piping and on such piping without cathodic protection.

DE 10 2015 105 747 A1, which corresponds to US2018/0086923, employs an adhesion promoter in the form of an undercoat composition it refers to as a primer. The undercoat composition comprises a spirit-based solvent and at least one hydrocarbon resin. Since in particular the welding of pipes and the preparation of the particular surface requiring protection consistently involves working with heat and, for example, with an open flame or a hot air blower, there are problems with the subsequent application and/or stocking of an undercoat composition of this kind that comprises at least one spirit-based solvent. Further factors are that such solvents may result in environmental and health risks in the context of their possible recycling, in relation to emissions, and due to their high flammability, in the workplace, and in particular may lead to considerable transportation problems. The solvent-containing undercoats cannot be dispatched by airfreight, owing to their high flammability. Since, conversely, the locations where such undercoat compositions are used, specifically for pipeline construction in particular, are generally far removed from warehousing and production sites, the necessary road transport with corresponding hazardous goods approvals constitutes a considerable time and cost factor.

The technical problem on which the invention is based, therefore, is that of specifying an undercoat composition for corrosion control in the weld region, at repair sites or for whole-pipe insulation on plastic-sheathed steel piping both with and without cathodic protection, this composition being solvent-free.

SUMMARY OF THE INVENTION

It is therefore an object of the present invention to solve this technical problem, and a solvent-free undercoat composition is provided.

The undercoat employed in an exemplary embodiment of the invention is an aqueous or water-based dispersion of solvent-free design, hence expressly forgoing customary organic solvents such as mineral spirit, for example, and using only water for preparing the dispersion.

In the sense of the present invention, water is considered not to be a solvent, since it does not give rise to the disadvantages outlined that affect production, transportation and application.

The advantages achieved with the invention are in particular that: application can be carried out with extremely simple equipment such as brushes or rollers, for example; the undercoat composition is free from organic solvents and is therefore not combustible and is nonflammable; transportation and storage are made much easier; and the undercoat composition is compatible with appropriate anticorrosion material such as, in particular, butyl rubber-based tapes and shrink sleeves, and meets the applicable standard requirements with regard to the corrosion control system.

The undercoat composition of the invention is composed at least of the following components: component K1: a water-based rubber dispersion, component K2: a water-based resin dispersion, and component K3: a water-based silane emulsion.

To further improve the compatibility of components K1 to K3 with one another and to increase the peel resistance of the completed corrosion control system relative to the substrate, it is possible with preference to make additional use in the undercoat composition of a fourth component K4, namely a liquid, water-soluble phenol-formaldehyde resin and/or a water-based phenol-formaldehyde resin dispersion.

To establish the application-relevant properties of the undercoat composition of the invention it is also possible to use further additives, such as, for example, aqueous rheology modifiers for adjusting the viscosity of the undercoat, or defoamers for forming a dense, bubble-free layer on the untreated surface. For the coloring of the undercoat composition, water-based color pastes can be used.

The first component K1, the water-based rubber dispersion, dries to form a layer which is impervious to water and oxygen, which ensures outstanding corrosion control on the metallic surface, and secures the adhesion of the applied corrosion control system on the substrate.

The rubber in the water-based rubber dispersion is one from the group of butyl, bromobutyl, isoprene or chloroprene rubber, individually or in a combination thereof. In this context, the invention initially starts from the recognition that the production of a water-based rubber dispersions is fundamental knowledge.

Because the water-based dispersions or emulsions are generally dilutable with water, the quantity figures for the undercoat components are based, as solids content, on the dried undercoat: this means that the calculation does not take account of the amount of water.

In accordance with the invention, the water-based rubber dispersion as component K1 is present in the undercoat composition with a fraction of 10 wt % to 60 wt %, solids content, based on the total mass of the dried undercoat. Observed more particularly for the water-based rubber dispersion is a fraction of 15 wt % to 50 wt %, preferably a fraction of 20 wt % to 40 wt %, in each case as solids content based on the total mass of the dried undercoat.

In fact the rubber in question is a liquid and can be prepared as a solvent-free aqueous dispersion by simple mixing, as described illustratively in WO 2002/010302 A1 with further references. Also described there is the fundamental preparation of a water-based resin dispersion.

A second component K2, the water-based resin dispersion, also referred to as tackifier, improves the adhesion both to nonpolar substrates such as the polyolefinic plastic sheathing of the piping, and to an exposed steel surface. For the purposes of the invention, the resin in the water-based resin dispersion may be a hydrocarbon resin and/or a natural resin.

The water-based resin dispersion as component K2 is present in a fraction of 20 wt % to 90 wt %, solids content, based on the total mass of the dried undercoat, in the undercoat composition. Regarded as being especially suitable more particularly for the water-based resin dispersion is a fraction of 25 wt % to 85 wt %. The fraction of the water-based resin dispersion in the adhesion promoter is preferably 30 wt % to 75 wt %, in each case as solids content based on the total mass of the dried undercoat.

The third component K3 of the undercoat composition of the invention is an aqueous emulsion of prehydrolyzed organofunctional silanes and/or mixtures thereof. Organofunctional silanes act as molecular bridges between organic polymers and inorganic materials.

The organofunctional silanes are selected from a series of silanes which have alkoxy groups and organic groups, such as amino, vinyl and epoxy groups, for example. These are particularly suitable for fulfilling the stated bridge function in the preferred area of application of the undercoat composition, namely the production or repair of corrosion control system on steel piping, in accordance with the invention.

Rapidly developing processes often require silanes for which the first step, to form silanol groups, has already taken place, and there can therefore be a rapid reaction with the substrate. Accordingly, organofunctional silanes used in accordance with the invention are already prehydrolyzed, for more rapid drying. The organofunctional silanes are also used in order to improve the adhesion on nonpolar substrates and on steel. As the undercoat composition dries, the prehydrolyzed silanes form a stable chemical bond to the steel surface and lead to a marked reduction in water absorption.

To protect metallic components from corrosion, an organic coating system with additional cathodic corrosion control is often employed. The combination of passive and active corrosion control, i.e., of organic coating and cathodic corrosion protection (CCP) by means, for example, of impressed current, is employed generally on metallic constructions such as, in particular, subterranean tanks and for pipelines. By no means, however, is this combination chemically unproblematic, since the hydroxide ions formed at the cathode lead locally to an alkaline electrolyte which, depending on the coating system, may react with polar anchor groups between the coating and the substrate or else with the coating itself. This leads firstly to the delamination of the coating (loss of adhesion), secondly to a reduction in the mechanical strength within the coating (loss of cohesion), and lastly to the blistering and destruction of the corrosion control system.

As a result of the chemical connection of the undercoat composition of the invention to a steel surface by way of the organofunctional silanes, there is resistance to cathodic disbondment at elevated temperatures. Accordingly, the undercoat composition of the invention can always be used, irrespective of whether there is or is not any cathodic corrosion protection provided. Importance therefore attaches to the purpose stated for the undercoat composition of the invention.

Regarded as particularly preferable for the aforesaid third constituent K3 is a fraction of 0.1 wt % to 10 wt %, solids content, based on the total mass of the dried undercoat. The fraction of the third component K3 may more particularly be 0.2 wt % to 8 wt %, preferably 0.5 wt % to 5 wt %, in each case as solids content based on the total mass of the dried undercoat.

As already elucidated, the undercoat composition of the invention is designed as a dispersion which is aqueous and also free from organic solvents. Besides the principal constituents K1, K2 and K3 of the undercoat composition of the invention, namely: the water-based rubber emulsion K1, the water-based resin dispersion K2 and the aqueous emulsion of prehydrolyzed organofunctional silanes K3. A preferred additional possibility is a fourth component K4, for improving the compatibility of components K1 to K3 and for increasing the peel resistance of the corrosion control system. Provided as component K4 is the addition of a liquid, water-soluble phenol-formaldehyde resin or of an aqueous phenol-formaldehyde resin dispersion, preferably a resol resin.

Observed as being particularly preferred for the aforesaid fourth constituent K4 is a fraction of 1 wt % to 30 wt %, solids content, based on the total mass of the dried undercoat. More particularly the fraction of the fourth constituent K4 may be between 3 wt % and 20 wt % and preferably 5 wt % to 15 wt %, in each case as solids content based on the total mass of the dried undercoat.

Overall, the drying time is dependent on temperature. A particular advantage of the undercoat composition of the invention is that its components K1 to K3 and optionally K4, individually and in the mixture with one another, are temperature-stable for a wide working temperature range. Overall, the undercoat composition of the invention provides an adhesion promoter which can be processed at room temperature even if it then has a long drying time. The drying time may be reduced in general by preheating the surface of the repair site before application of the undercoat composition of the invention to a temperature of more than 40° C. for up to a few minutes, but at any rate up to much less than an hour. In order to ensure more rapid drying, the surface to be wrapped ought therefore to be preheated, from 40° to 70° C., for example.

A further, particular advantage of the invention is that the drying of the undercoat composition of the invention is associated with a change in color, if a color pigment paste for coloring the undercoat composition is not used. The underlying reason for this is that the elastomer-based aqueous undercoat while still wet typically possesses a white color, owing to the rubber fraction and/or to the use of a corresponding rubber dispersion and/or as a result of the resin used, and this white color disappears as drying progresses, so making the undercoat very largely transparent thereafter. The undercoat composition of the invention thus possesses an inherent drying indicator.

In fact, the rubber dispersion (K1) and the resin dispersion (K2) each take the form of a milky and therefore white liquid, which overall forms the water-based dispersion as a constituent of the undercoat. As a result, the above-described color change is observed during the drying, and can be employed as an extra criterion of sufficient drying and for the elapse of the drying time.

The procedure for producing the formulation of the undercoat composition of the invention is that component K2, the water-based resin dispersion, has been added at 23° C. into component K1, the water-based rubber dispersion, with continual stirring using a customary mechanical stirrer. This is followed by further careful stirring for 5 to 10 minutes. During this stirring operation, the third component K3, the silane emulsion, has then also been added and stirred for a further 10 to 15 minutes. The possible additives, such as a color paste and a rheology modifier, are added and incorporated by stirring within around 1 minute. Lastly the fourth component, namely the liquid, water-soluble phenol-formaldehyde resin or aqueous phenol-formaldehyde resin dispersion, is added and the formulation is stirred for a further 5 minutes.

Essential to the invention is that all of components K1 to K3 and optionally K4, comprising the undercoat composition of the invention, are miscible and storable with one another and in particular can also be applied together. In spite of the very different mechanisms of action of the respective components, they are selected so that they can be painted on together and develop their respective activities from the mixture.

Described below is an example of how a weld at an abutment between two plastic-sheathed steel pipes is provided retrospectively with protection from corrosion.

A plastic tape for application to the prepared surface to be wrapped at the abutment site may have a single-ply or two-ply construction. A shrink sleeve may also be applied. In the case of a two-ply plastic tape, operation takes place preferably with an inner tape and an outer tape. In that case, the inner tape is first of all applied to the surface, and then the outer tape is applied to the inner tape. Both tapes may be processed preferably cold. Hot processing, however, is also possible, as in the case of a shrink sleeve.

The inner tape and also the outer tape typically comprise an elastomer tape. An alternative possibility is for the inner tape to take the form of an elastomer tape, and the outer tape the form of a thermoplastic tape.

The elastomer tape is formed for this purpose advantageously of butyl rubber. Suitable butyl rubbers which can be used are, typically, noncrosslinked butyl rubbers. These include, in particular, copolymers or block copolymers of isobutylene with about 0.5 wt % to about 5.0 wt % of isoprene, based on the total mass of the butyl rubber. They may also include halogenated butyl rubbers or else mixtures of two or more butyl rubbers.

Both the inner tape and the outer tape may be individually or cumulatively self-adhesive. In this context, a PE-based (polyethylene) adhesive is normally employed. Preference is given to using an adhesive based on butyl rubber. In fact, in general, the inner tape is furnished with an adhesive layer on its inner surface. The thickness of the adhesive layer may be around 0.1 mm to 1 mm. The thickness of the inner tape is around 0.5 mm to 1.5 mm.

The outer tape generally comprises a carrier film made of polyethylene (PE), polypropylene (PP) or another thermoplastic, with a thickness of 0.2 mm to 0.5 mm. A multilayer configuration is also possible. Generally speaking, the outer tape is not self-adhesive, and its primary purpose is the external mechanical protection of the wrapping. Accordingly, the inner tape is equipped with an impact-resistant layer in the form of the elastomer or butyl rubber used, and is provided on the inner surface with the aforementioned adhesive layer. Following the application of the outer tape to the inner tape, the two tapes undergo cold fusion and the surface to be protected receives the desired sealing.

The inner tape and outer tape, respectively, are each applied by winding around the surface that is to be wrapped. A procedure of this kind is advisable particularly for pipes. The overall winding with the inner tape and/or the outer tape is helical, operating with an overlap of at least 30% and more particularly at least 50%. This means that the leading and trailing turns of the respective tape overlap one another in such a way that the trailing turn overlaps the leading turn with at least 30% of its strip width.

As a result, a corresponding anticorrosion wrapping is provided which achieves particularly eco-friendly wrapping of the surfaces to be protected, in a manner that poses no risk to health. The ultimate basis for this is that an aqueous dispersion which is also free from organic solvents is applied as an undercoat to the surface that is to be protected. These constitute the key advantages.

The water-based and solvent-free undercoat composition developed in accordance with the invention for an anticorrosion wrapping not only meets the standard requirements identified above but also possesses the particular advantage—by comparison with known, solvent-containing undercoat compositions for the specific purpose of corrosion control on plastic-sheathed steel piping—that it is eco-friendly and is not classed as a hazardous substance for transportation, since it is incombustible and nonflammable.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
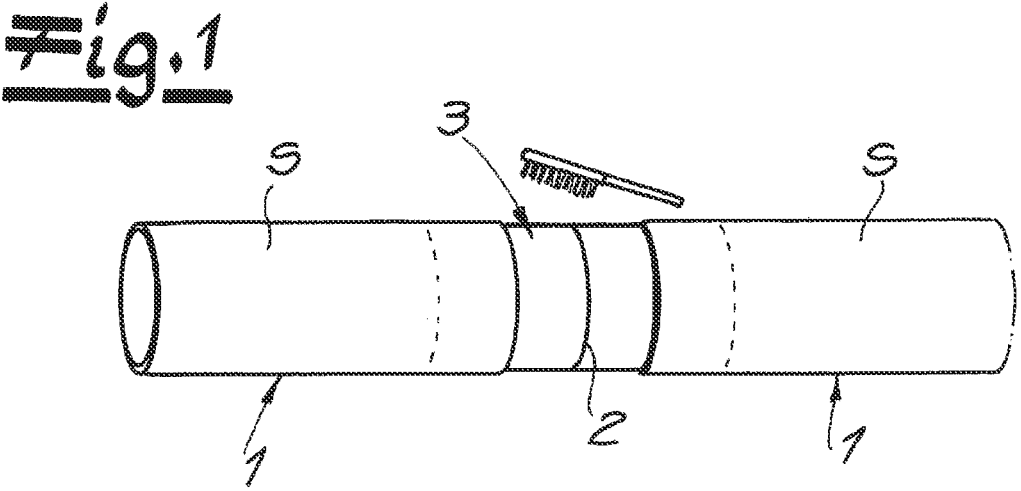
FIGS. 1 to 6 each show an abutment of two steel pipes at different phases of the method of use, according to an exemplary embodiment.

In FIG. 1, two metallic steel pipes 1 are apparent, which are joined in the abutment region 3 with a welded connection 2. In order to be able to apply the welded connection 2, a plastic sheathing, or a so-called factory jacket, in the form of a polyethylene (PE) layer S, has initially been removed in the abutment region, allowing the exposed surface regions 3 at the end of the metallic inner pipes to be subsequently joined with the welded connection 2.

So that the pipes 1 do not subsequently undergo corrosion in the region of their abutment and of the surface 3 exposed there, an anticorrosion wrapping is applied to the surface 3 in accordance with the invention, as elucidated in detail hereinafter.

Figure 2:
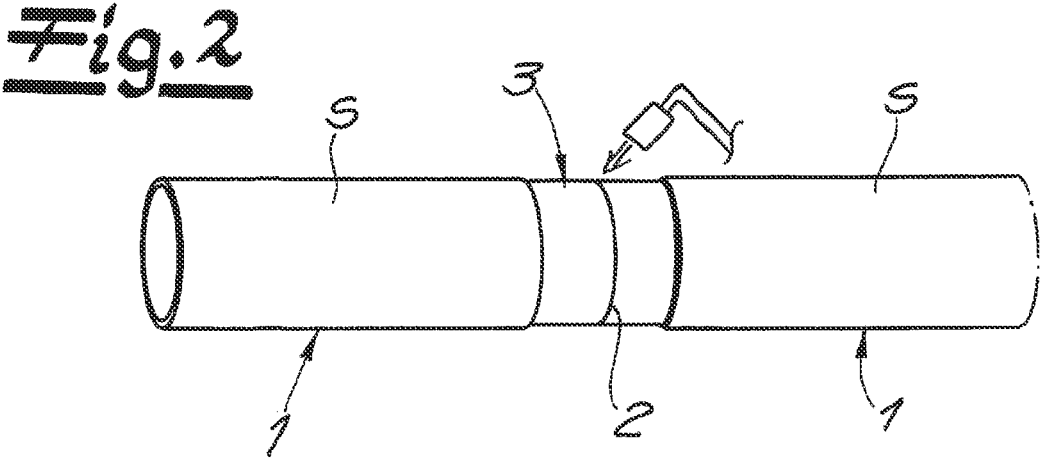

For this purpose, first of all, in accordance with the representation in FIG. 1, the surface 3 is cleaned and freed as and where necessary from residual moisture, as shown in FIG. 2. Operation for this purpose may take place with a hot air fan or, as represented, with an open propane gas flame.

Figure 3:
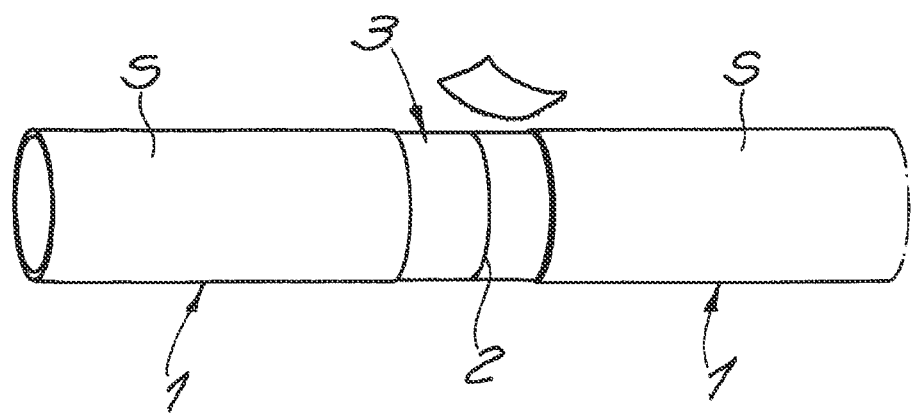

In the subsequent FIG. 3, as and where necessary, the transition of the surface 3 to the wrapping or to the PE layer S is then smoothed and cleaned, this being illustrated by a suggested abrasive paper.

Figure 4:
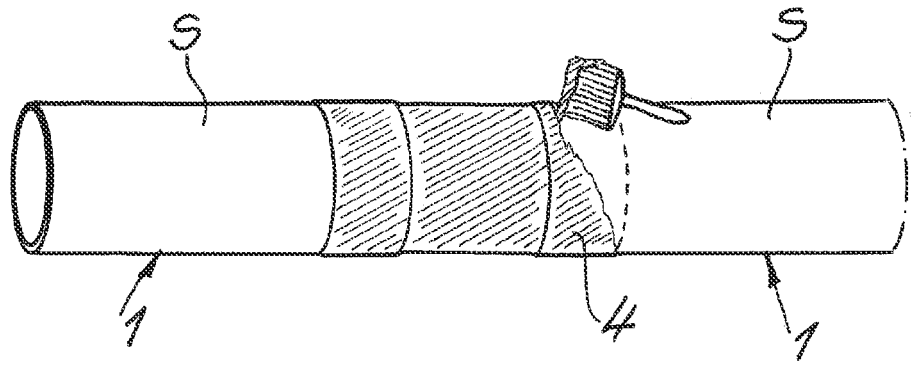

Subsequently, in the context of FIG. 4, an elastomer-based undercoat composition 4 is applied. The undercoat composition 4 used in accordance with the invention is an aqueous and also solvent-free dispersion, which is applied to the surface 3 to be protected. For details regarding the chemical constitution and the physical properties, especially the peel resistance, of the adhesion promoter 4, reference may be made to the observations above.

When the undercoat composition 4 has dried, which generally requires drying times of less than 10 min at room temperature, the actual wrapping can then be applied. The drying of the undercoat composition 4 also entails a change in color. In fact, while still wet, the adhesion promoter 4 predominantly possesses a white color and becomes transparent as drying progresses, meaning that the drying process can be verified visually and possibly by touch.

Figure 5:
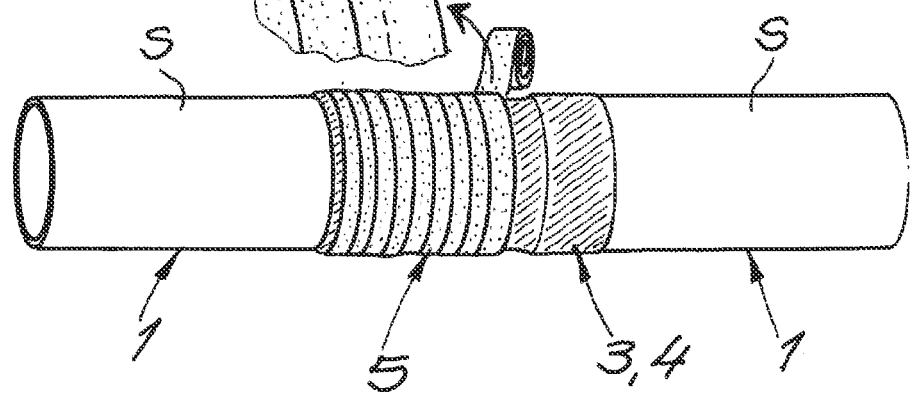

After the drying of the adhesion promoter 4, in accordance with the representation in FIG. 5, an inner tape 5 is first applied to the surface 3 by winding with a slight tension. The inner tape 5 in this case is wound helically around the surface 3 of the steel pipe that is to be sheathed, and also around the adjacent regions of the PE layer S. An overlap Ü of at least 30% is observed, as shown in enlarged form in FIG. 5. In other words, the overlap Ü of at least 30% means that a subsequent wrapping or turn covers a leading wrap with at least 30% of its width, as depicted in the enlarged representation in FIG. 5.

Figure 6:
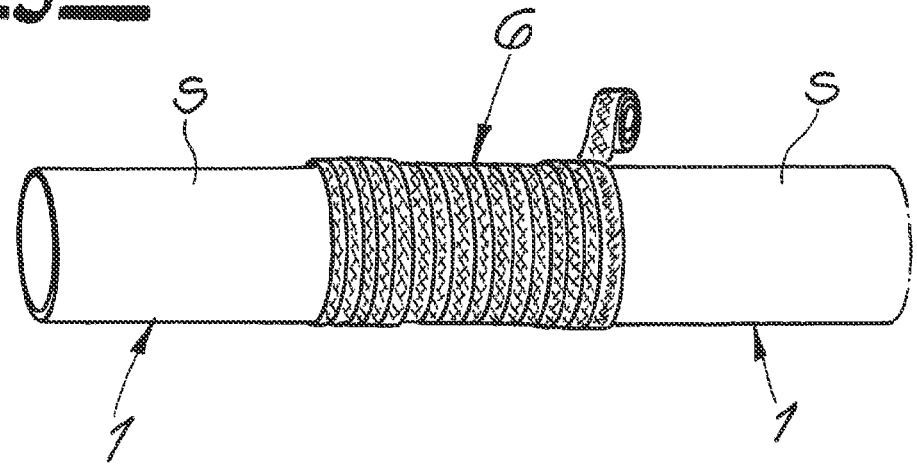

When the inner tape 5 has been applied to the surface 3 to be sheathed, the outer tape 6 is subsequently wound in a comparable way, with similar overlap, likewise helically around the surface 3 or around the inner tape 5, as represented by FIG. 6.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A solvent-free undercoat composition for corrosion control at welds on plastic-sheathed steel pipes with and without cathodic protection, the composition comprising:

a component K1 being a water-based rubber dispersion with a rubber from the group of butyl, bromobutyl, isoprene or chloroprene rubber or combinations thereof, for formation of a barrier layer for isolating the welds from oxygen, water vapor and water penetrating from externally;

a component K2 being a water-based resin dispersion comprising a hydrocarbon resin and/or a natural resin, for adhesion on a metallic surface of the welds and on nonpolar surfaces of the plastic sheathing; and a component K3 being an aqueous emulsion of prehydrolyzed organofunctional silanes for accelerating drying, for improving the adhesion to the metallic surface, and for increasing resistance to cathodic disbondment, wherein the following fractions of the components, specified in each case as solids content are based on the total mass of the dried undercoat:

component K1 with a fraction of 10 wt % to 60 wt %;

component K2 with a fraction of 20 wt % to 90 wt %; and component K3 with a fraction of 0.1 wt % to 10 wt %.

2. The undercoat composition as claimed in claim 1, wherein component K3 is selected from a series of organofunctional silanes which have at least one alkoxy group and at least one organic group.

3. The undercoat composition as claimed in claim 2, wherein the organic group of component K3 is an amino, vinyl or epoxy group.

4. The undercoat composition as claimed in claim 1, wherein fractions of the components, specified in each case as solids content are based on the total mass of the dried undercoat:

component K1 with a fraction of 15 wt % to 50 wt %, component K2 with a fraction of 25 wt % to 85 wt % and component K3 with a fraction of 0.2 wt % to 8 wt %.

5. The undercoat composition as claimed in claim 4, wherein fractions of the components, specified in each case as solids content are based on the total mass of the dried undercoat:
component K1 with a fraction of 20 wt % to 40 wt %,
component K2 with a fraction of 30 wt % to 75 wt % and
component K3 with a fraction of 0.5 wt % to 5 wt %.

6. The undercoat composition as claimed in claim 1, further comprising a liquid, water-soluble phenol-formaldehyde resin and/or a water-based phenol-formaldehyde resin dispersion as additional component K4.

7. The undercoat composition as claimed in claim 6, wherein a fraction of component K4 is a fraction of 1 wt % to 30 wt % solids content, based on the total mass of the dried undercoat.

8. The undercoat composition as claimed in claim 7, wherein a fraction of component K4 is a fraction of 3 wt % to 20 wt % solids content, based on the total mass of the dried undercoat.

9. The undercoat composition as claimed in claim 8, wherein a fraction of component K4 is a fraction of 5 wt % to 15 wt % solids content, based on the total mass of the dried undercoat.

10. The undercoat composition as claimed in claim 1, further comprising an aqueous rheology modifier.

11. The undercoat composition as claimed in claim 1, wherein a coloration is performed via at least one water-based color paste.

12. The undercoat composition as claimed in claim 6, wherein, component K4 is a resol resin.

13. A solvent-free undercoat composition for corrosion control at a repair site on plastic-sheathed steel pipes with and without cathodic protection, the composition comprising:
a component K1 being a water-based rubber dispersion with a rubber from the group of butyl, bromobutyl, isoprene or chloroprene rubber or combinations thereof, for formation of a barrier layer for isolating the repair site from oxygen, water vapor and water penetrating from externally;
a component K2 being a water-based resin dispersion comprising a hydrocarbon resin and/or a natural resin, for adhesion on a surface of the repair site and on a nonpolar surface of the plastic sheathing; and
a component K3 being an aqueous emulsion of prehydrolyzed organofunctional silanes,
wherein the following fractions of the components, specified in each case as solids content are based on a total mass of the solvent-free undercoat:
component K1 with a fraction of 10 wt % to 60 wt %;
component K2 with a fraction of 20 wt % to 90 wt %; and
component K3 with a fraction of 0.1 wt % to 10 wt %.

14. An undercoat composition, comprising:
10 wt % to 60 wt % of a water-based rubber dispersion with a rubber from the group of butyl, bromobutyl, isoprene or chloroprene rubber or combinations thereof;
20 wt % to 90 wt % of a tackifies comprising a water-based resin dispersion comprising a hydrocarbon resin and/or a natural resin; and
0.1 wt % to 10 wt % of an aqueous emulsion of prehydrolyzed organofunctional silanes.

* * * * *